United States Patent Office 3,803,181
Patented Apr. 9, 1974

3,803,181
REACTIVE ANTHRAQUINONE DYESTUFFS
Kiyosumi Shigemasa and Giichi Sato, Tokyo, Japan, assignors to Nippon Kayaku Kabushiki Kaisha, Tokyo, Japan
No Drawing. Filed Aug. 27, 1971, Ser. No. 175,709
Int. Cl. C09b 1/32
U.S. Cl. 260—372
9 Claims

ABSTRACT OF THE DISCLOSURE

Reactive dyestuffs having the General Formula 1

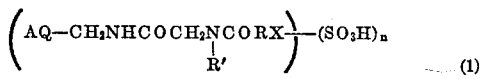
(1)

are produced by reacting an anthraquinone dyestuff which combines through an N or O atom with either a reactive aromatic nucleus having a replaceable hydrogen, represented by the General Formula 2

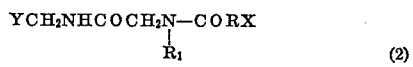
(2)

or with a reactive aromatic nucleus having a replaceable hydrogen, represented by the General Formula 3

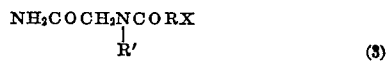
(3)

in combination with formaldehyde or a compound which forms a formaldehyde. The product may be sulfonated, if desired.

DETAILED DESCRIPTION OF INVENTION

The present invention relates to the production of reactive anthraquinone dyestuffs having the General Formula 1

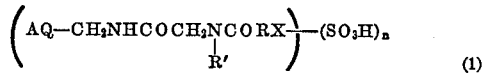
(1)

wherein AQ is an anthraquinone dyestuff residue which combines through an N or O atom with an aromatic nucleus having a replaceable hydrogen, R is a saturated or unsaturated lower aliphatic hydrocarbon residue. R' is a hydrogen atom or lower alkyl group, X is a chlorine or bromine atom and $n$ is an integer from 1 to 4.

The dyestuffs of the present invention are manufactured by the following two processes.

(I) An anthraquinone dyestuff which combines through an N or O atom with an aromatic nucleus having a replaceable hydrogen atom is reacted with a reactive substance represented by the General Formula 2

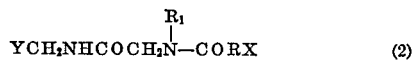
(2)

wherein Y is a halogen atom or a hydroxy group, and R, R' and X are same as mentioned above. The product is sulfonated, if necessary.

(II) An anthraquinone dyestuff which combines through an N or O atom with an aromatic nucleus having a replaceable hydrogen atom, is reacted with a reactive substance represented by the General Formula 3

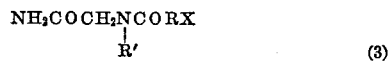
(3)

wherein R, R' and X are same as mentioned above, in combination with formaldehyde or a compound which forms a formaldehyde. The produce is sulfonated, if necessary.

The anthraquinone dyes used in the present invention are, for example, 1-amino-4-arylaminoanthraquinone-2-sulfonic acid,
1,4-bisarylaminoanthraquinone,
1-amino-2-aryloxy-4-arylaminoanthraquinone,
1-alkylamino-4-arylaminoanthraquinone,
1-hydroxy-4-arylaminoanthraquinone,
4-arylamino-1,9-anthrapyridone,
4,4'-bisarylaminodianthrimide,
1,4-diamino-2,3-diphenoxyanthraquinone,
1-amino-2-methyl-4-arylaminoanthraquinone,
1-amino-2-halogeno-4-arylaminoanthraquinone,
1,4-diamino-2-aryloxyanthraquinone,
1,5-dihydroxy-4-nitro-8-arylaminoanthraquinone,
1,5-dihydroxy-4-amino-8-arylamino-anthraquinone,
1,5-diamino-4,8-dihydroxy-2-hydroxyphenylanthraquinone,
1,5-diamino-4,8-dihydroxy-2-alkoxyphenylanthraquinone, etc. It is preferable that there are an alkyl and/or alkoxyl group in an aryl group of these compounds.

The reactive substance represented by the General Formula 2 when Y is OH, is obtained by treating the reactive substance represented by the General Formula 3 with formaldehyde in a weak alkaline solution or by allowing the same reactive substance to react in a sulfuric acid solution with a substance which forms formaldehyde, such as paraformaldehyde, and the reaction substance represented by the General Formula 2, when Y is a halogen atom, is obtained by reacting the reactive substance represented by the General Formula 3 with symmetrical dihalogenodimethyl ether. It is used in the form of sulfonic acid solution.

The reactive substance of the General Formula 3 is manufactured by acylating glycine alkylester or sarcosine-alkylester with the halogenide of a halogenated fatty acid, such as chloroacetylchloride, β-chloropropionyl chloride, α,β-dibromoacryloyl bromide, etc., and then changing the resulting ester into an amide.

The process (I) of the present invention is preferably carried out as follows:

The condensation reaction of one of the said anthraquinone dyes with a reactive substance of the General Formula 2 is carried out in the presence of a dehydrating acidic condensing agent, preferably sulfuric acid in concentration of 80% to 90% at 0°–50° C. for up to 20 to 30 hours. After the completion of this reaction, the reaction mixture is poured into ice-water to form a precipitate. The precipitate is separated, the acid is neutralized and the produce is filtered.

The process (II) of the present invention may be carried out as follows:

One of said anthraquinone dyestuffs together with a reactive substance of the Formula 3 is dissolved in sulfuric acid, and symmetrical halogenodimethylether or paraformaldehyde is added at a low temperature. The reaction is carried out by heating slowly.

If, after the completion of the condensation reaction, the introduction of a sulfonic acid group into the product is necessary, fuming sulfuric acid may be added to the reaction mixture or the product may be separated, dried and then sulfonated with fuming sulfuric acid. The same isolation step as in process (I) is used to obtain the dyestuff of the present invention.

The dyestuff thus obtained is suitable for dyeing wool, silk, synthetic polyamide fibres and leather in a brilliant shade with good fastness to light, water, milling and washing. Furthermore, this dyestuff also gives to cellulosic fibres or cellulosic acetate fibres a shade fast to light and washing.

The present invention may be further explained by the following examples.

EXAMPLE 1

4.4 parts of the sodium salt of a dyestuff having the structural formula

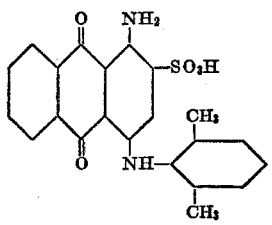

which is obtained by condensing 1 mole of 1-amino-4-bromo-anthraquinone-2-sulfonic acid with 1 mole of 2,6-xylidine, are dissolved in 60 parts of 98% sulfuric acid, keeping the temperature below 10° C.

2.1 parts of N-methylolchloroacetylglycinamide are added to this solution which is then stirred at 10°–15° C. for 16 hours. After the reaction, the solution is poured into ice water and precipitated, dyestuff is separated by filtration. The dyestuff cake is then suspended in water and a dilute solution of sodium hydroxide is added until the pH is 5.0. After the dyestuff is thoroughly dissolved, sodium chloride is added to precipitate the dyestuff as its sodium salt. The formula of this dyestuff is the following:

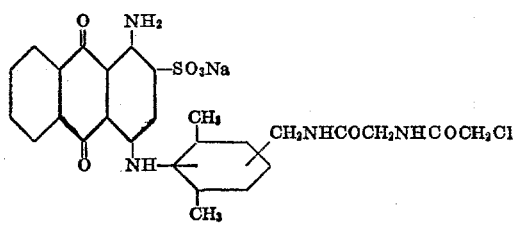

The dyestuff is a dark blue powder and dyes wool a fast blue in a weakly acidic dyebath.

When in the example 2.3 parts of N-methylol chloroacetylsarcosine amide are used instead of N-methylol chloroacetyl glycin amide, a similar dyestuff having the following formula is obtained

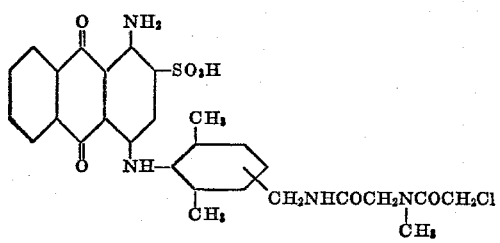

EXAMPLE 2

4.6 parts of the sodium salt of a dyestuff having the following formula,

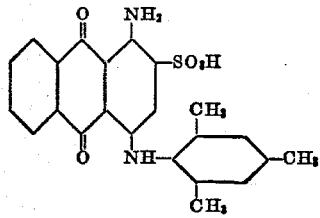

are dissolved in 60 parts of 96% sulfuric acid at or below 10° C. 1.7 parts of chloroacetyl glycin amide and 0.36 part of paraformaldehyde are added into this solution and stirred at 10°–15° for 16 hours. This mixture is poured into ice-water and the dyestuff is separated by the process of Example 1. This dyestuff having the following formula dyes wool fast blue in a weakly acidic dyebath.

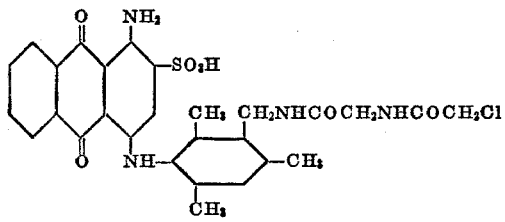

When in this example 2.0 parts of 2-chloroacryloylsarcosine amide are used instead of 1.7 parts of chloroacetyl glycin amide, a fast blue dyestuff of the following formula is obtained.

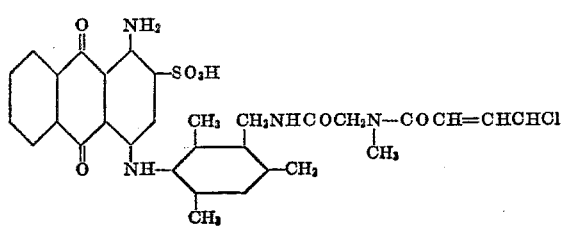

EXAMPLE 3

4.74 parts of a dyestuff having the following formula

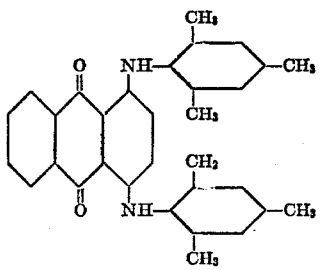

are dissolved in 60 parts of 98% sulfuric acid keeping the temperature, below 10° C. 3.4 parts of chloroacetyl glycin amide are added. After the solution is cooled below 5° C., 14 parts of dichlorodimethylether are added. The solution is heated slowly up to 10° C. and stirred at 10°–15° C. for 16 hours. The solution is poured into ice water, the precipitate obtained is separated by filtration and washed until the filtrate becomes neutral. The product is dried under vacuum.

The dyestuff obtained is sulfonated by adding it to 50 parts of 10% fuming sulfuric acid at 10°–15° C. The sulfonation takes place at 15°–18° C. for 2 hours. The reaction mixture is poured into ice water, and after the dyestuff is separated, neutralization, salting-out, filtration and drying under vacuum are carried out.

The dyestuff thus obtained is reperesented by the following formula and dyes wool fast blue in a weakly acidic bath.

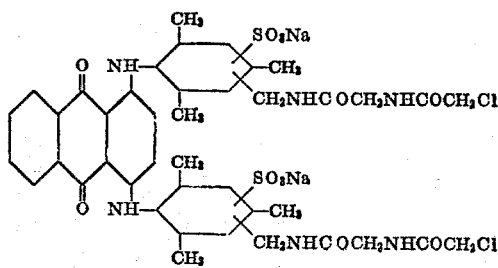

Each of the dyestuffs represented by the formula shown below can be produced by a process similar to that of Example 3,

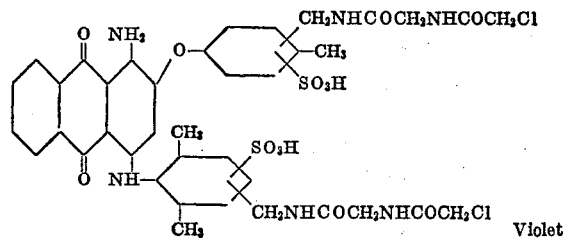
Violet

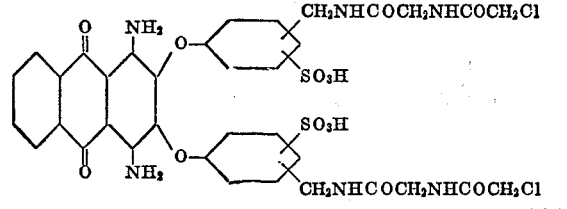
Violet

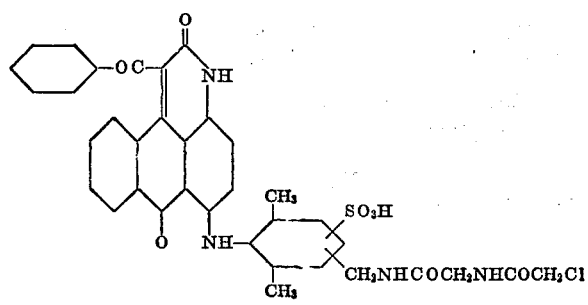
Red

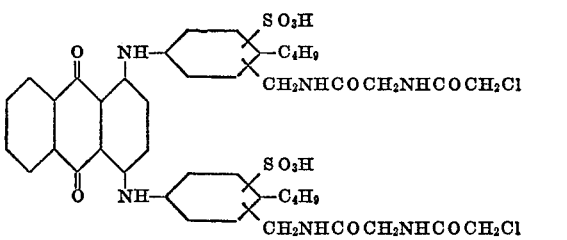

In this table, the color named on the right of each formula indicates that obtained when dyeing wool. Even if materials dyed with any of these dyestuffs are immersed in a 5% pyridin solution, very little of the dyestuff split out.

EXAMPLE FOR REFERENCE

A process for manufacture of N-methylolchloroacetyl glycine 28 parts of a hydrochloride of glycinethyl ester are dissolved in 300 parts of water. While keeping the pH at 6–7 with an acid binding agent, and the temperature below 5° C., 15 parts of chloroacetyl chloride are added dropwise.

The precipitate deposited is separated by filtration and dried under vacuum. 24 parts of chloroacetyl glycinethyl ester are obtained.

60 parts of aqueous ammonia of 0.9 specific gravity are cooled below 5° C. 1.8 parts of chloroacetyl glycin ethyl ester are added and this solution is stirred for 30 minutes at the same temperature. The chloroacetyl glycin amide precipitate is separated by filtration and dried under vacuum.

35% formalin is made weakly alkaline with potassium carbonate. An equivalent amount of chloroacetyl glycin amide is added and stirred at 60° C. for 30 minutes. The liquid is removed under vacuum and a powder, N-methylol chloroacetyl glycin amide is obtained.

We claim:
1. A reactive anthraquinone dyestuff having the formula

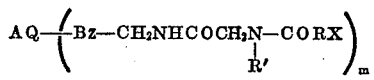

wherein AQ is an anthraquinone radical selected from the group consisting of
  1-amino-2-sulfoanthraquinone-4-ylamino,
  1-N-alkylaminoanthraquinone-4-ylamino,
  1-hydroxyanthraquinone-4-ylamino,
  1-amino-2-methylanthraquinone-4-ylamino,
  1-amino-2-halogenoanthraquinone-4-ylamino,
  1,4-diamino-anthraquinone-2-yloxy,

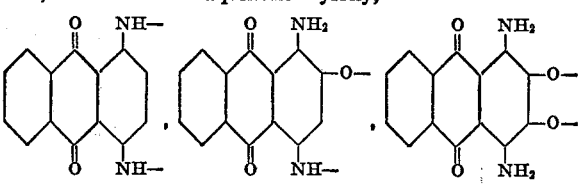

Bz is a benzene radical linked to AQ via a nitrogen or an oxygen atom, Bz may also be substituted by 1–3 lower-alkyl groups having 1–4 carbon atom or a sulfonic acid group, R is $CH_2$, $CH_2$—$CH_2$ or $CH=CH$, R' is a hydrogen atom or a methyl group, X is a chlorine or bromine atom, m is 1 or 2, and the compound contains at least one sulfonic acid group.

2. A reactive anthraquinone dyestuff in accordance with claim 1, having the formula

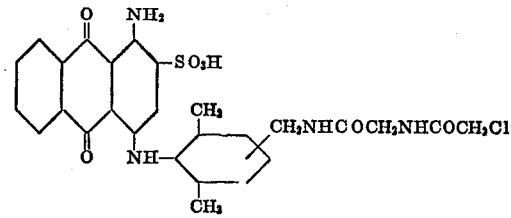

3. A reactive anthraquinone dyestuff in accordance with claim 1, having the formula

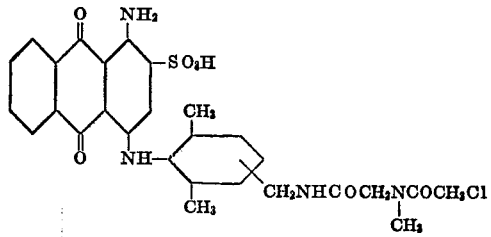

4. A reactive anthaquinone dyestuff in accordance with claim 1, having the formula

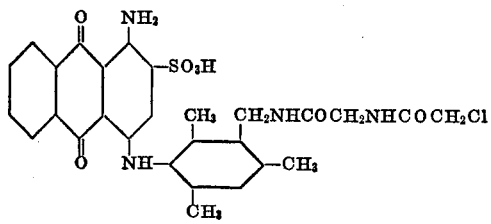

5. A reactive anthraquinone dyestuff in accordance with claim 1, having the formula

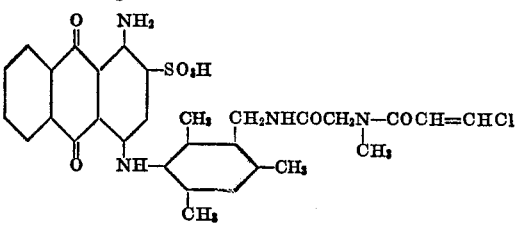

6. A reactive anthraquinone dyestuff in accordance with claim 1, having the formula

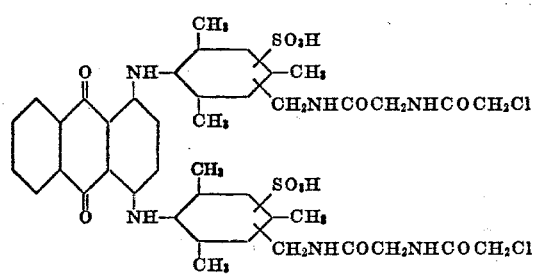

7. A reactive anthraquinone dyestuff in accordance with claim 1, having the formula

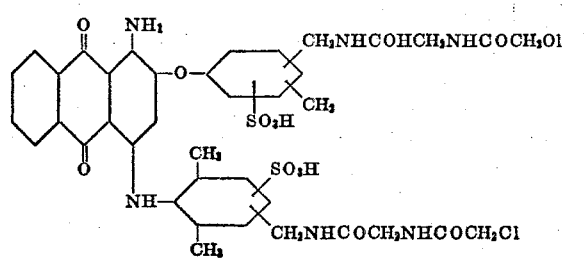

8. A reactive anthraquinone dyestuff in accordance with claim 1, having the formula

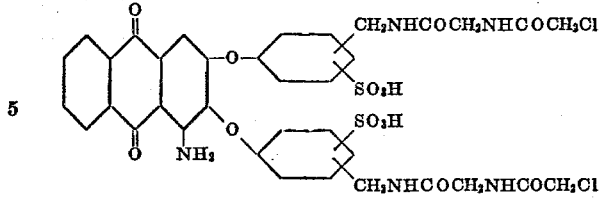

9. A reactive anthraquinone dyestuff in accordance with claim 1, having the formula

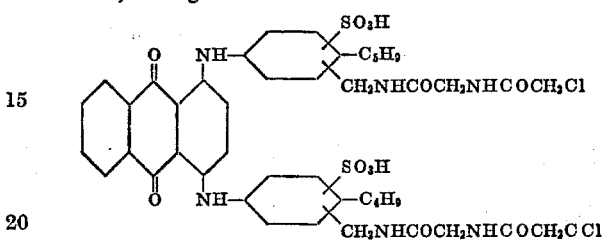

References Cited
UNITED STATES PATENTS
3,538,128  11/1970  Schwander et al. _____ 260—372
3,682,978   8/1972  Machatzke et al. _____ 260—372

LORRAINE A. WEINBERGER, Primary Examiner
E. J. SKELLY, Assistant Examiner

U.S. Cl. X.R.
260—278; 368